(12) United States Patent
Poole et al.

(10) Patent No.: US 11,052,469 B2
(45) Date of Patent: **\*Jul. 6, 2021**

(54) SELF-ADJUSTING POCKET HOLE JIG

(71) Applicants: Robert N. Poole, Coronado, CA (US); Daniel L. Poole, Glendale, AZ (US); Michael G. Asimakis, Scottsdale, AZ (US)

(72) Inventors: Robert N. Poole, Coronado, CA (US); Daniel L. Poole, Glendale, AZ (US); Michael G. Asimakis, Scottsdale, AZ (US)

( \* ) Notice: Subject to any disclaimer, the term of this patent is extended or adjusted under 35 U.S.C. 154(b) by 119 days.

This patent is subject to a terminal disclaimer.

(21) Appl. No.: 16/509,332

(22) Filed: Jul. 11, 2019

(65) Prior Publication Data

US 2019/0329330 A1 Oct. 31, 2019

Related U.S. Application Data

(63) Continuation of application No. 15/683,525, filed on Aug. 22, 2017, now Pat. No. 10,376,967.

(60) Provisional application No. 62/378,337, filed on Aug. 23, 2016.

(51) Int. Cl.
*B23B 47/28* (2006.01)

(52) U.S. Cl.
CPC ........ *B23B 47/287* (2013.01); *B23B 2247/10* (2013.01); *B23B 2247/12* (2013.01); *Y10T 408/567* (2015.01)

(58) Field of Classification Search
CPC .............. B23B 47/287; B23B 2247/10; B23B 2247/12; B23B 2260/048; B23B 2260/0482; B23B 2260/0485; B23B 2260/0487; B23B 2251/52; B25B 1/00; B25B 1/02; B25B 1/14; B25B 5/02; B25B 5/12

See application file for complete search history.

(56) References Cited

U.S. PATENT DOCUMENTS

| 7,641,425 | B2* | 1/2010 | Sommerfeld | B23B 47/287 269/224 |
| 7,967,534 | B2* | 6/2011 | McDaniel | B23B 47/287 408/103 |
| 9,782,837 | B2* | 10/2017 | Pelkey | B23B 47/287 |
| 2014/0341665 | A1* | 11/2014 | Clark | B23Q 11/0042 408/67 |

(Continued)

*Primary Examiner* — Eric A. Gates
*Assistant Examiner* — Chwen-Wei Su
(74) *Attorney, Agent, or Firm* — Parsons & Goltry; Robert Parsons; Michael Goltry

(57) ABSTRACT

A self-adjusting pocket hole jig includes a base having a clamp end and a toggle end, a guide carried by the base and reciprocally movable between a raised position and a lowered position. A clamp assembly is carried by the base and reciprocally movable between an engaged position and a disengaged position. An adjustment mechanism is coupled between the guide and the clamp assembly. The adjustment mechanism is arranged to move the clamp assembly in a forward direction to the engaged position and correspondingly move the guide in a downward direction to the lowered position, and arranged to move the clamp assembly in a rearward direction to the disengaged position and correspondingly move the guide in an upward direction to the raised position.

7 Claims, 11 Drawing Sheets

(56) References Cited

U.S. PATENT DOCUMENTS

2015/0033514 A1\* 2/2015 Poole ................. B25B 5/068
24/524

\* cited by examiner

SELF-ADJUSTING POCKET HOLE JIG

CROSS-REFERENCE TO RELATED APPLICATION

This application claims the benefit of U.S. Non-Provisional application Ser. No. 15/683,525, filed 22 Aug. 2017 which claims the benefit of U.S. Provisional Patent Application No. 62/378,337, filed 23 Aug. 2016.

FIELD OF THE INVENTION

This invention relates to pocket hole jig tools, and more specifically to pocket hole jig tools that are self-adjusting.

BACKGROUND OF THE INVENTION

Pocket hole joinery is used extensively in woodworking as a quick and easy way to join two wood workpieces. A pocket hole is a pilot hole drilled at an angle in a first wood workpiece to align a screw for fastening to a second workpiece. A step drill creates a counterbored hole, or pocket, for the head of the pocket screw and a smaller diameter for body clearance. The counterbore or pocket of the pocket holes receive the pocket hole screw heads, hiding them in the internal, underside construction areas of woodworking projects.

It is important for the pocket hole to be drilled to the correct height in a workpiece. If the height is too small, the screw will stick through the surface of the joined part. If the height is too big, the joint will not be as strong as it should be. The correct pocket height will be different for different thickness of wood and different screw lengths.

Currently, various jigs have been provided for assisting in the drilling of pocket holes. However, precision and correctly measuring placement of the hole in a workpiece is important. Current jigs are useful in correctly forming holes in a workpiece, but they require extensive measurements during positioning of a workpiece or extensive trial and error to find the correct placement.

It would be highly advantageous, therefore, to remedy the foregoing and other deficiencies inherent in the prior art.

SUMMARY OF THE INVENTION

Briefly, to achieve the desired objects and advantages of the instant invention, provided is a self-adjusting pocket hole jig including a base having a clamp end and a toggle end, a guide carried by the base intermediate the clamp end and the toggle end, and reciprocally movable between a raised position and a lowered position. A clamp assembly is carried by the base and reciprocally movable between an engaged position when moved toward the guide and a disengaged position when moved away from the guide. An adjustment mechanism is coupled between the guide and the clamp assembly. The adjustment mechanism is arranged to move the clamp assembly in a forward direction to the engaged position and correspondingly move the guide in a downward direction to the lowered position, and arranged to move the clamp assembly in a rearward direction to the disengaged position and correspondingly move the guide in an upward direction to the raised position.

In a specific aspect, provided is an adjustment mechanism including a bar having a first end coupled to the clamp assembly and a second end extending from the clamp assembly under the guide to a position proximate the toggle end. A translation mechanism is coupled between the guide and the clamp assembly.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
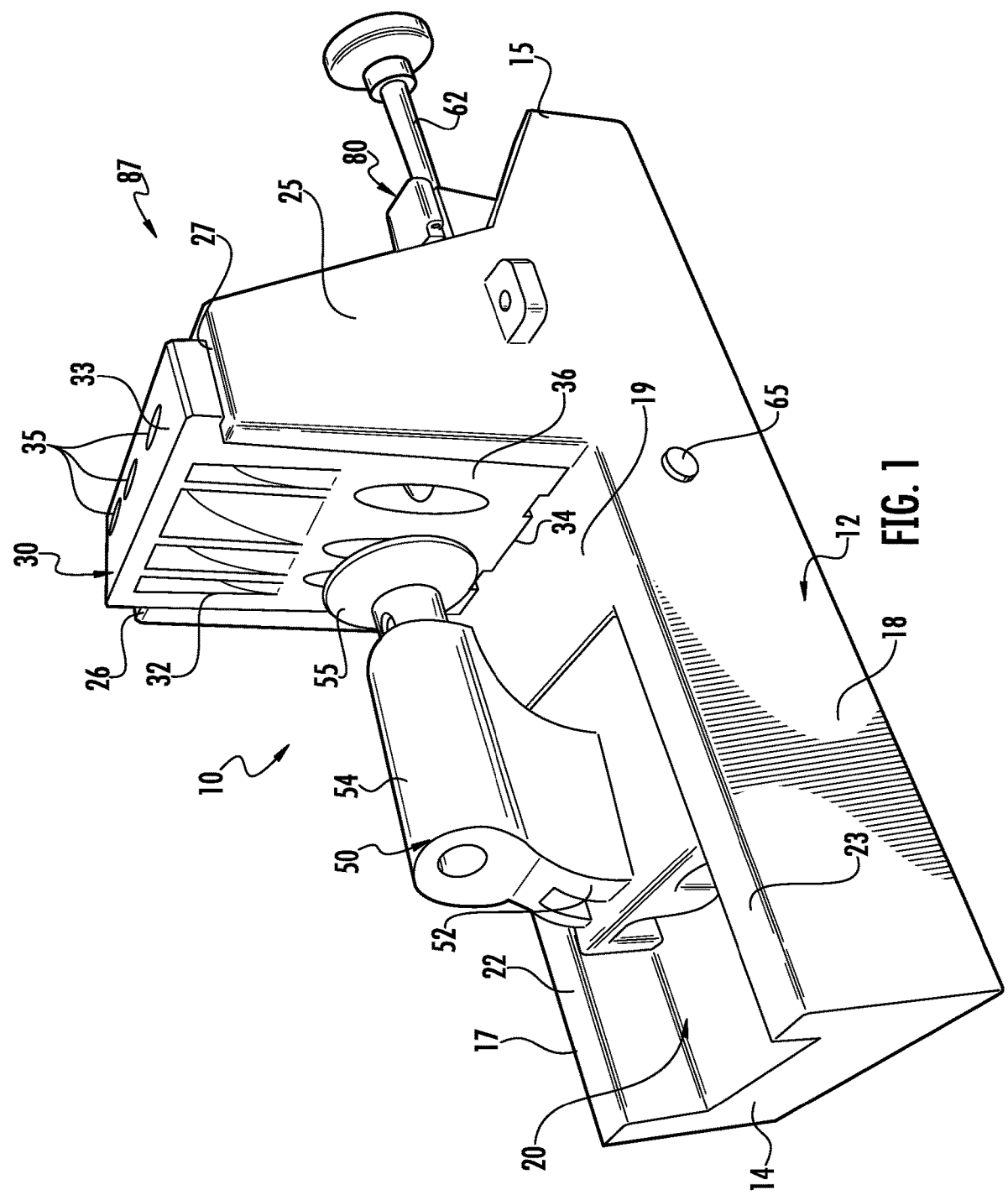
FIG. 1 is a perspective view of a self-adjusting pocket hole jig accordance with the present invention, in a lowered position.
Figure 2:
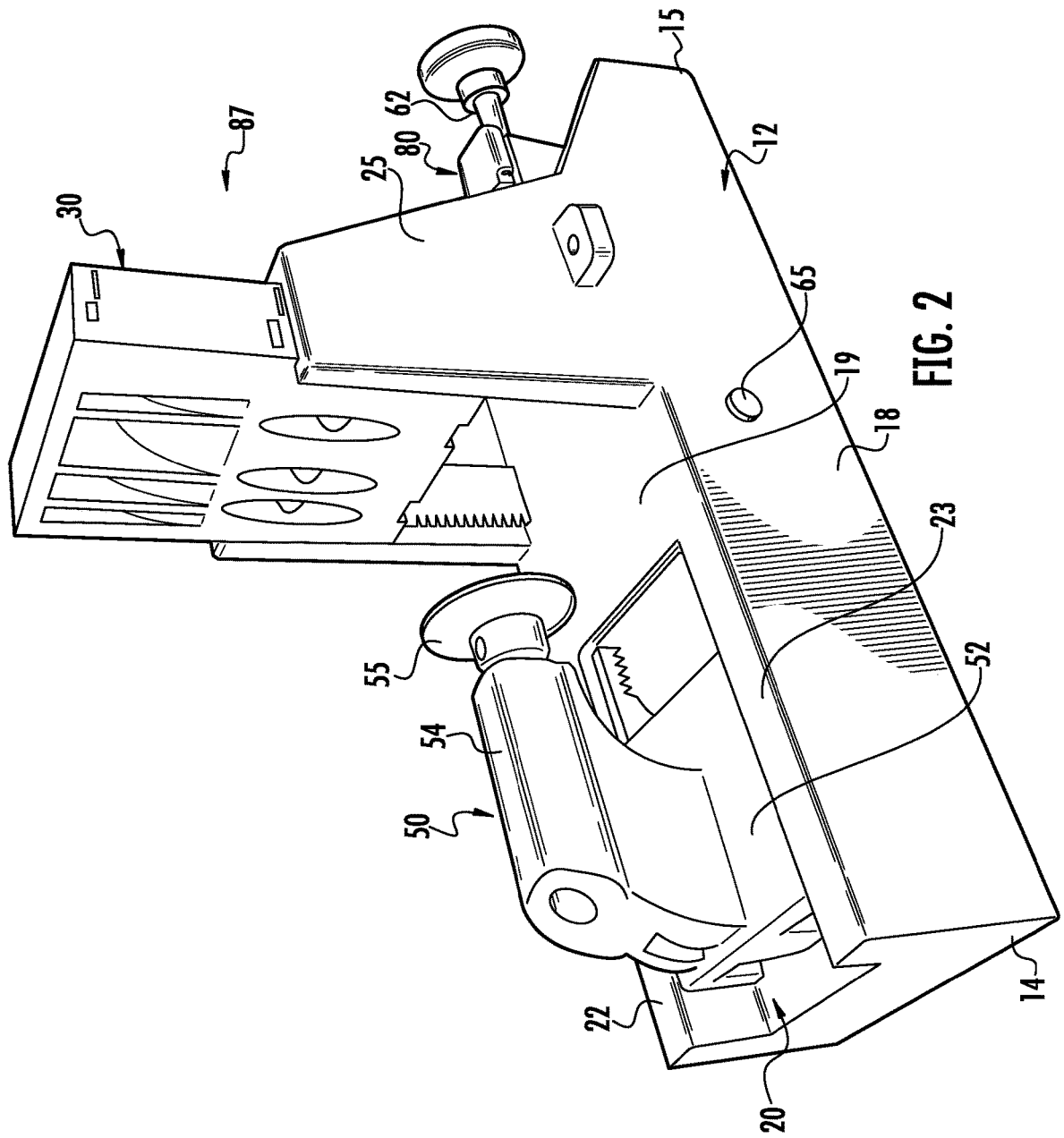
FIG. 2 is a perspective view of the self-adjusting pocket hole jig of FIG. 1, in a raised position.

Turning now to the drawings in which like reference characters indicate corresponding elements throughout the several views, attention is first directed to FIGS. 1 and 2 which illustrate a self-adjusting pocket hole jig, generally designated 10, in accordance with the present invention. Jig 10 includes a base 12 having a clamp end 14, a toggle end 15, opposing sides 17 and 18, and a platform 19 extending from side 17 to side 18 and positioned intermediate clamp end 14 and toggle end 15. Base 12 also includes a channel 20 formed at clamp end 14 and extending from clamp end 14 to platform 19. Portions 22 and 23 of base 12 at sides 17 and 18, respectively, extend from clamp end 14 to platform 19, define channel 20 and act as guide rails. A guide holder 25 extends substantially perpendicularly upwardly from platform 19. Guide holder 25 includes an inwardly facing vertical slot 26, proximate side 17 and an inwardly facing vertical slot 27, proximate side 18, each extending upwardly from platform 19. While base 12 preferably includes a planar bottom to allow it to be placed and used on a work surface, it will be understood that base 12 can have substantially any bottom to allow it to be placed on a surface or fixed to a surface such as with brackets, pegs and the like.

Figure 3:
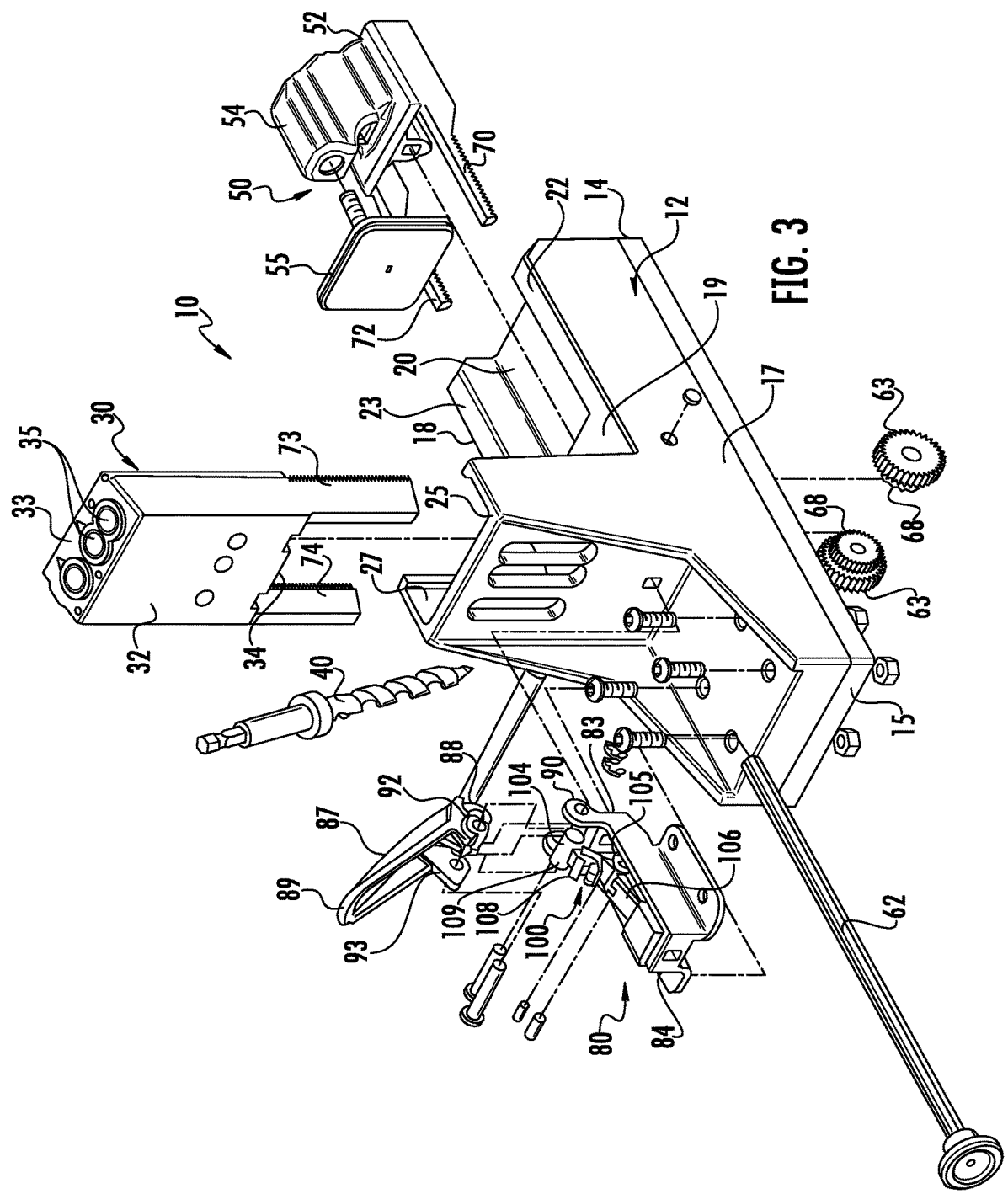
FIG. 3 is an exploded perspective view of the self-adjusting pocket hole jig of FIG. 1.
Figure 4:
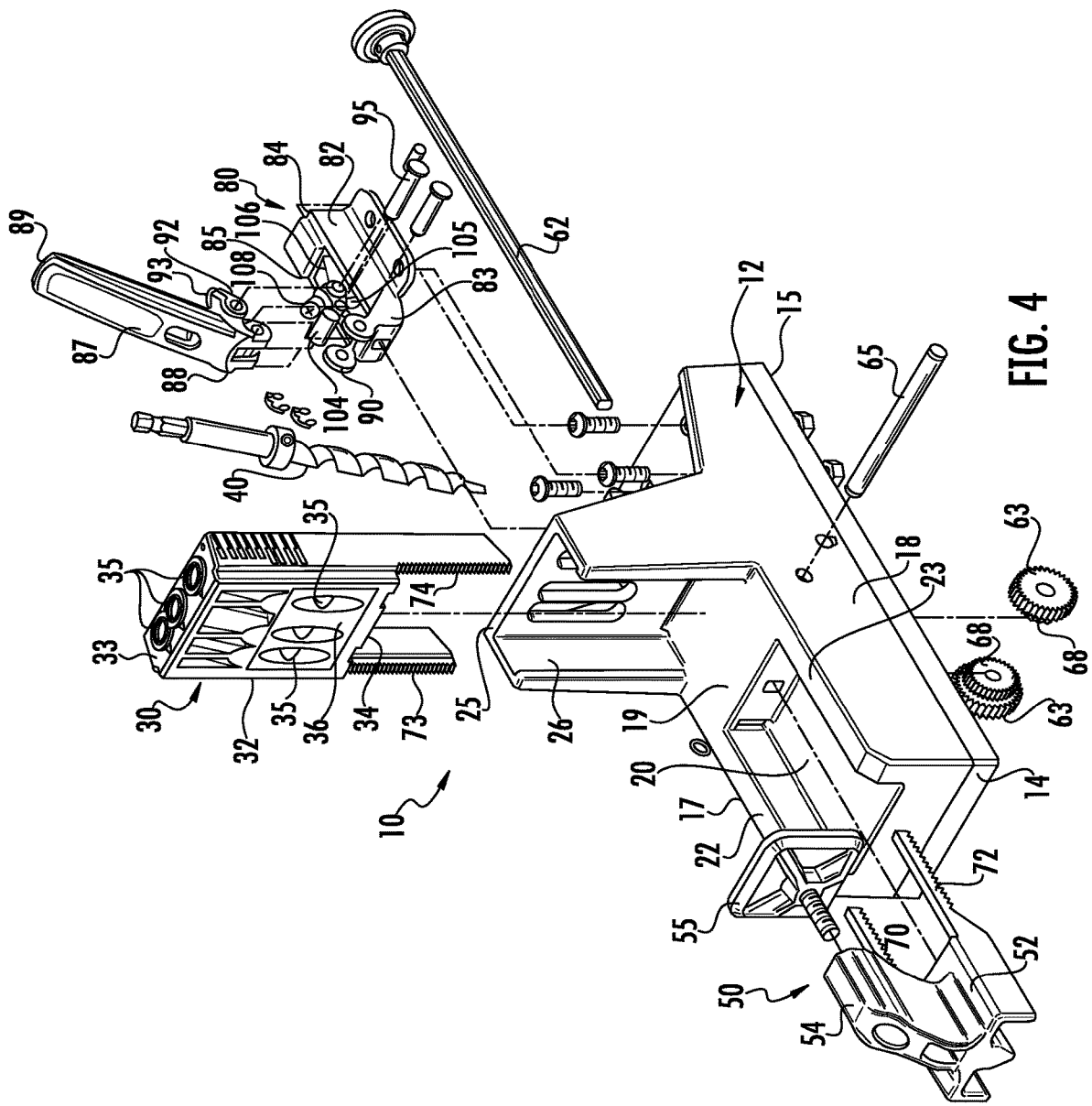
FIG. 4 is an exploded reversed perspective view of the self-adjusting pocket hole jig of FIG. 3.

Still referring to FIGS. 1 and 2 with additional reference to FIGS. 3 and 4, jig 10 also includes a guide 30 carried by guide holder 25 and reciprocally movable vertically along slots 26 and 27 in an upward direction and a downward direction between a raised position and a lowered position, respectively. Guide 30 includes a body 32 having a top 33, a bottom 34 and at least one and preferably two or more guide channels 35 extending therethrough from top 33 to a surface 36 above bottom 34. Guide channels 35 are disposed to receive and guide the shank of a drill bit 40 (FIGS. 3 and 4). A clamp assembly 50 is carried within channel 20 of base 12. Clamp assembly 50 includes a carriage 52 reciprocally movable within channel 20 between an engaged position (clamping a workpiece) and a disengaged position (releasing a workpiece), and a clamp arm 54 positioned above and carried by carriage 52. In the preferred embodiment, the disengaged position is when carriage 52 is moved in a rearward direction away from guide 30, toward end 14 (also referred to as a rearward position). The engaged position is when carriage 52 is moved in a forward direction toward guide 30, away from end 14 (also referred to as a forward position). Clamp arm 54 is directed towards toggle end 15 and terminates in a foot element 55. Foot element 55 engages a work piece to hold the work piece on platform 19 abutting surface 36 of guide 30 with carriage 52 in the engaged position.

Figure 5:
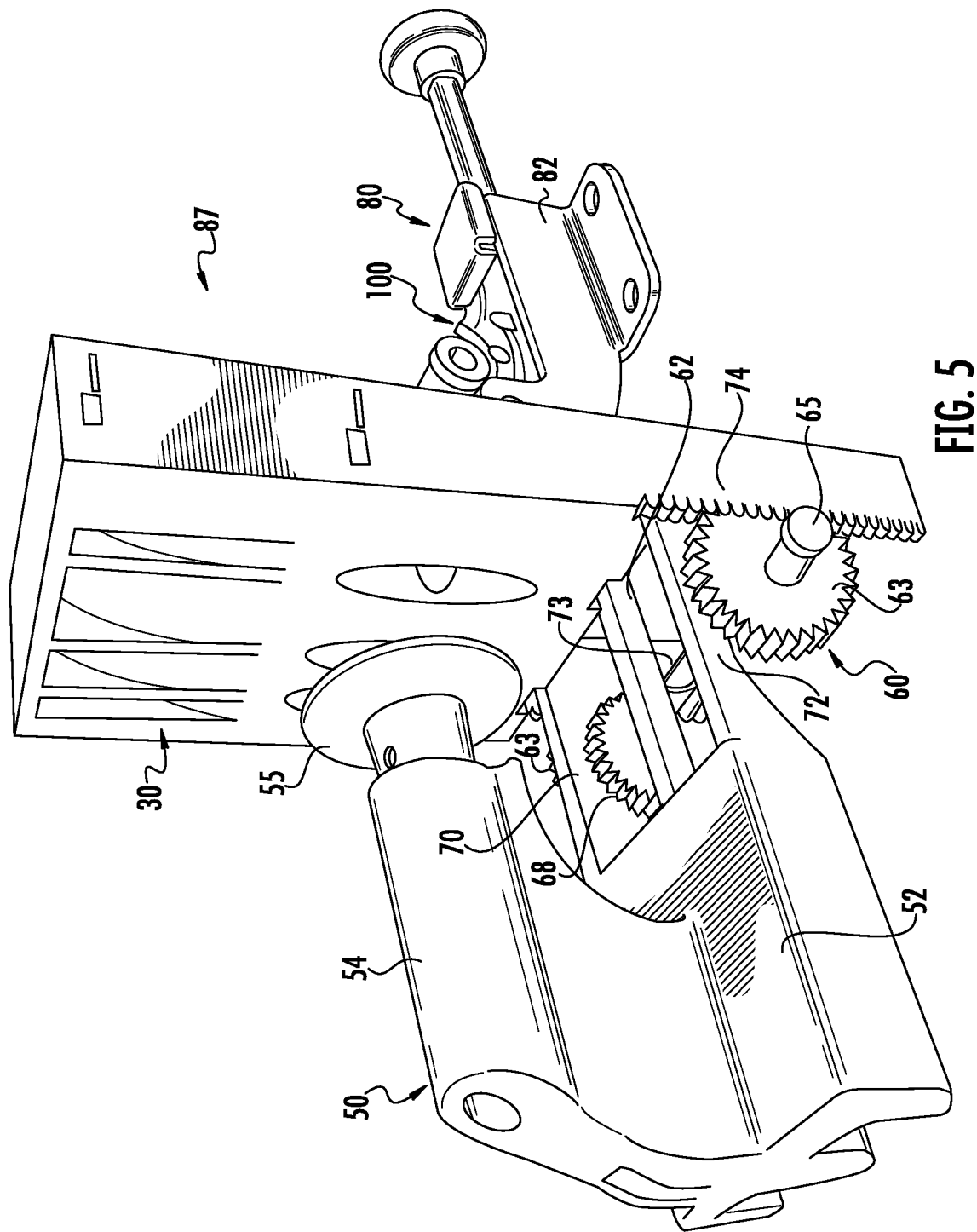
FIG. 5 is a perspective view of the jig with the base removed to show the adjustment mechanism in the lowered position.
Figure 6:
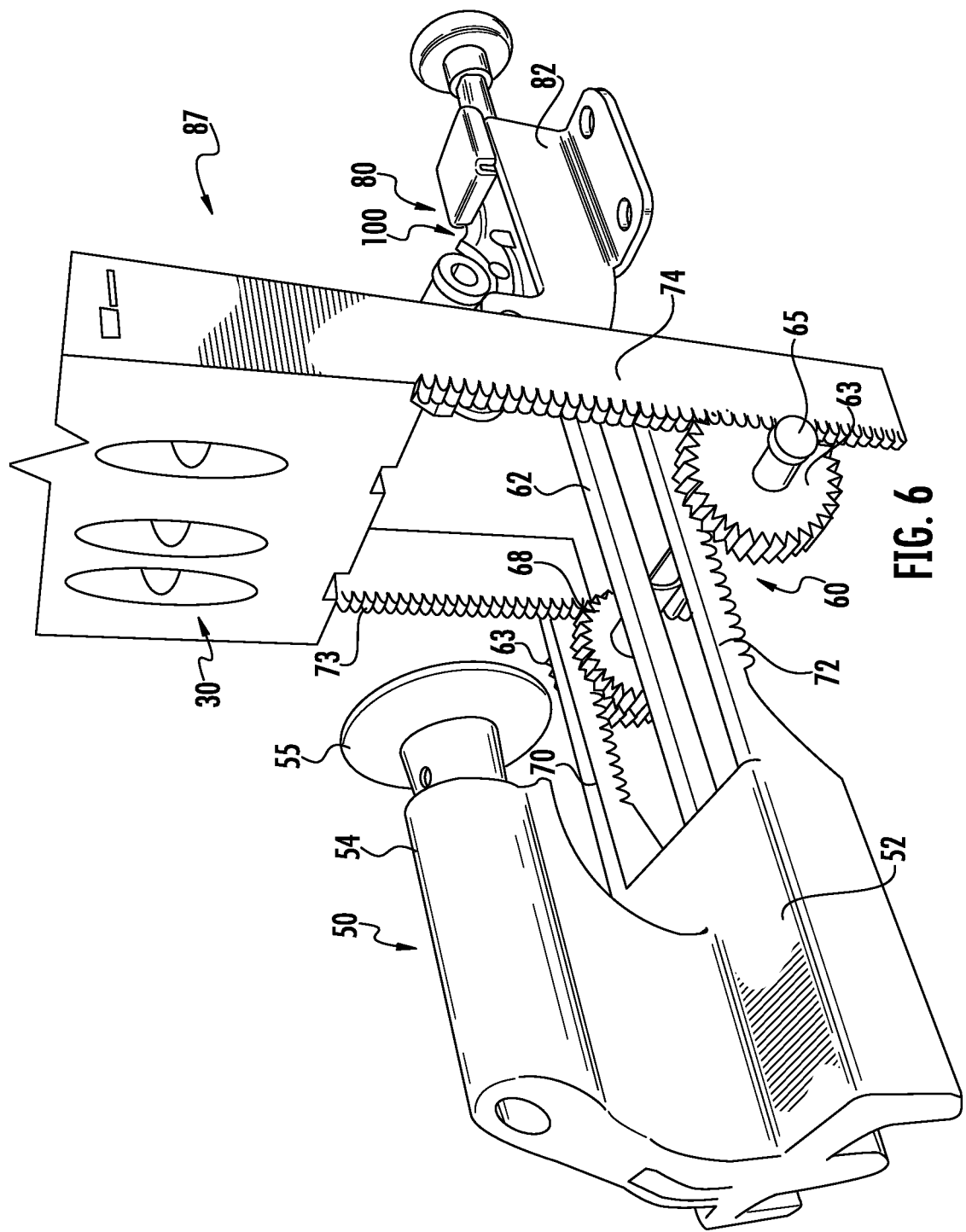
FIG. 6 is a perspective view of the jig with the base removed to show the adjustment mechanism in the raised position.

With additional reference to FIGS. 5 and 6, clamp assembly 50 is reciprocally movable between the forward position (FIGS. 1 and 5) and the rearward position (FIGS. 2 and 6) by an adjustment mechanism 60. Guide 30 is also movable between the lowered position (FIGS. 1 and 5) and the raised position (FIGS. 2 and 6) by adjustment mechanism 60 contemporaneous with the movement of clamp assembly 50. Thus, when clamp assembly 50 is moved in a forward direction guide 30 is correspondingly moved in a downward direction, and when clamp assembly 50 is moved in a rearward direction guide 30 is correspondingly moved in an upward direction. Adjustment mechanism 60 includes a bar 62 extending from toggle end 15 under platform 19 and into channel 20. Bar 62 fixedly engages carriage 52 of clamp assembly 50. When bar 62 is pushed longitudinally toward clamp end 14, clamp assembly 50 is moved toward the rearward position. When bar 62 is pulled longitudinally away from the clamp end, clamp assembly 50 is moved toward the forward position. To make movement of guide member 30 contemporaneous with movement of clamp assembly 50, turning the horizontal linear movement of clamp assembly 50 in vertical linear movement of guide 30, a translation mechanism is used. In this embodiment, the translation mechanism, a part of adjustment mechanism 60 includes a rack and pinion system. A double set of pinions (circular gears) are employed. A set of guide pinions 63 are carried by a pin 65 extending transversely through base 12 from side 17 to side 18. Guide pinions 63 are spaced apart and each positioned adjacent one of sides 17 and 18. A set of clamp pinions 68 are carried by pin 65 and are spaced apart and each positioned inside and adjacent to one of guide pinions 63. Guide pinions 63 and clamp pinions 68 rotate together, so that either the adjacent pinions are fixed together, or they are each fixed to pin 65 so as to rotate together. Clamp racks 70 and 72 (linear gears) extend forwardly from carriage 52 within channel 20 toward toggle end 15. Clamp racks 70 and 72 are spaced apart and parallel and engage clamp pinions 68. Guide racks 73 and 74 extend downwardly from bottom 34 on opposing sides of body 32. Racks 73 and 74 are received down through slots 26 and 27, respectively to a position below platform 19 to engage guide pinions 63.

Therefore, as bar 62 moves clamp assembly 50, clamp racks 70 and 72 rotate clamp pinions 68. The rotation of clamp pinions 68 also results in the rotation of guide pinions 63. The rotation of guide pinions 63 translates into linear motion of guide racks 73 and 74, moving guide 30 contemporaneously with movement of clamp assembly 50. Guide pinions 63 and clamp pinions 68 can have different diameters to provide a proportional change from linear motion to rotational motion and back to linear motion. In this manner, the distance of the horizontal linear movement of clamp assembly 50 by bar 62 is proportionately translated to a vertical linear movement of guide 30. This translation can be fixed to a specific ratio of pinions so that as clamp assembly 50 is moved to a distanced from guide 30 to accommodate a work piece having a specific thickness, guide 30 self-adjusts, and is raised to a height with the correct proportions relative the thickness of the workpiece for positioning a pocket hole. A 7/10 gear ratio is preferred, but it will be understood that other ratios can be employed to achieve the desired movement of guide 30 in relation to clamp assembly 50.

Referring specifically to FIGS. 3 and 4, bar 62 is held in position by a toggle mechanism 80 carried by base 12 proximate toggle end 15. A toggle mounting body 82 is coupled to base 12, and includes opposing ends 83 and 84, and an elongated channel 85. An elongated actuating lever 87 includes an end 88 pivotally coupled to mounting body 82 proximate end 83 above elongated channel 85 at a pivot point 90 and an opposing end 89. Actuating lever 87 includes, in this specific embodiment, a pivot point 92 extending between two parallel projections 93 extending downwardly from actuating lever 87 intermediate end 88 and end 89. The two parallel projections 93 are spaced apart at pivot point 92 to form a mounting yoke that is positioned on both sides of a link, with a pivot pin 95 extending through both parallel projections 93 and the link, which will be described presently.

Still referring to FIGS. 3 and 4, bar 62 passes through elongated channel 85 of body 82. A self-adjusting toggle mechanism 100 generally includes three pivotally linked elements designated element 104, cam element 105, and locking element 106. Element 104 has an elongated body with the rearward end pivotally attached between spaced apart parallel projections 93 of actuating lever 87 at pivot point 92. The forward end of element 104 is bifurcated and the rearward end of cam element 105 is pivotally mounted in the bifurcation. Also, the forward end of element 104 has a vertically upwardly extending boss 108 formed thereon with a horizontally extending (generally parallel to element 104) threaded opening therethrough. An adjustment screw 109 is threadedly engaged in the opening and is oriented so that the forwardly extending end is movable. The front end of cam element 105 is pivotally engaged in a bifurcated rearward end of locking element 106 and the front end of locking element 106 is slideably engaged over bar 62. The front end of cam element 105 defines an upwardly and forwardly facing pressure adjustment surface positioned to engage the front end of adjustment screw 109 and adjust downward pivotal movement of self adjusting toggle mechanism 100.

Actuating lever 87 is movable between an opened position and a closed position to clamp a work piece between clamp assembly 50 and guide 30. In the opened position of actuating lever 87, bar 62 is movable to adjust the position of clamp assembly 50 against a work piece. Locking element 106 is positioned for sliding movement in relation to bar 62. In the open position, bar 62 is manually pulled so that foot 55 engages the work piece. Contemporaneously, guide 30 is raised or lowered to the corresponding proportional height for the thickness of the workpiece. In response to pivotal movement of actuating lever 87 toward base 12, pressure foot 55 is moved toward guide 30 until it engages the work piece disposed on platform 19 and element 104 pivots, which causes cam element 105 to pivot toward bar 62 at the union of elements 105 and 106. As element 104 and 105 pivot, locking element 106 moves toward bar 62 and the angular disposition of cam element 105 and element 104 relative to bar 62 progressively lessens. With pressure foot 55 engaged against the work piece, continued movement of actuating lever 87 toward base 12 drives toggle mechanism 50, causing locking element 106 to slide forwardly and elements 104 and 105 to pivot toward bar 62 until the point at which the bottom surface of cam element 105 bears against bar 62. At the point of contact between cam element 105 and bar 62, cam element 105 pivots ever so slightly away from bar 62 and drives locking element 106 away from bar 62 at the junction of elements 105 and 106, which causes locking element 106 to cant and thus frictionally engage bar 62. Cam element 105 thus acts as a lever, driving locking element 106 so as to cause it to cant and frictionally engage bar 62 in response to the force applied to actuating lever 87 in a direction toward base 12, which force is transferred to cam element 105 by element 104. This frictional engagement frictionally locks locking element 106 to bar 62. In response to continued force applied to actuating lever 87 toward base 12 and with locking element 106 frictionally locked against bar 62, a clamping pressure is applied by pressure foot 55 to the work piece. In the closed position of actuating lever 87, an over-the-center locking occurs at element 104 in relation to the pivoting action that takes place between actuating lever 87 and element 104 and between element 104 and cam element 515, thus locking actuating lever 87 in the closed position. This process takes place regardless of the size of the work piece positioned between pressure foot 55 and guide 30 because of the self adjusting feature. This structure is not described in further detail as it is fully described in U.S. Pat. No. 9,211,635, entitled SELF-ADJUSTING BAR CLAMP, filed Aug. 1, 2014 and issued Dec. 15, 2015, incorporated herein by reference. While a self-adjusting toggle mechanism is employed in the preferred embodiment, it will be understood that other types of locks or conventional toggle mechanisms, and the like can be employed to retain bar 62 in position.

Figure 7:
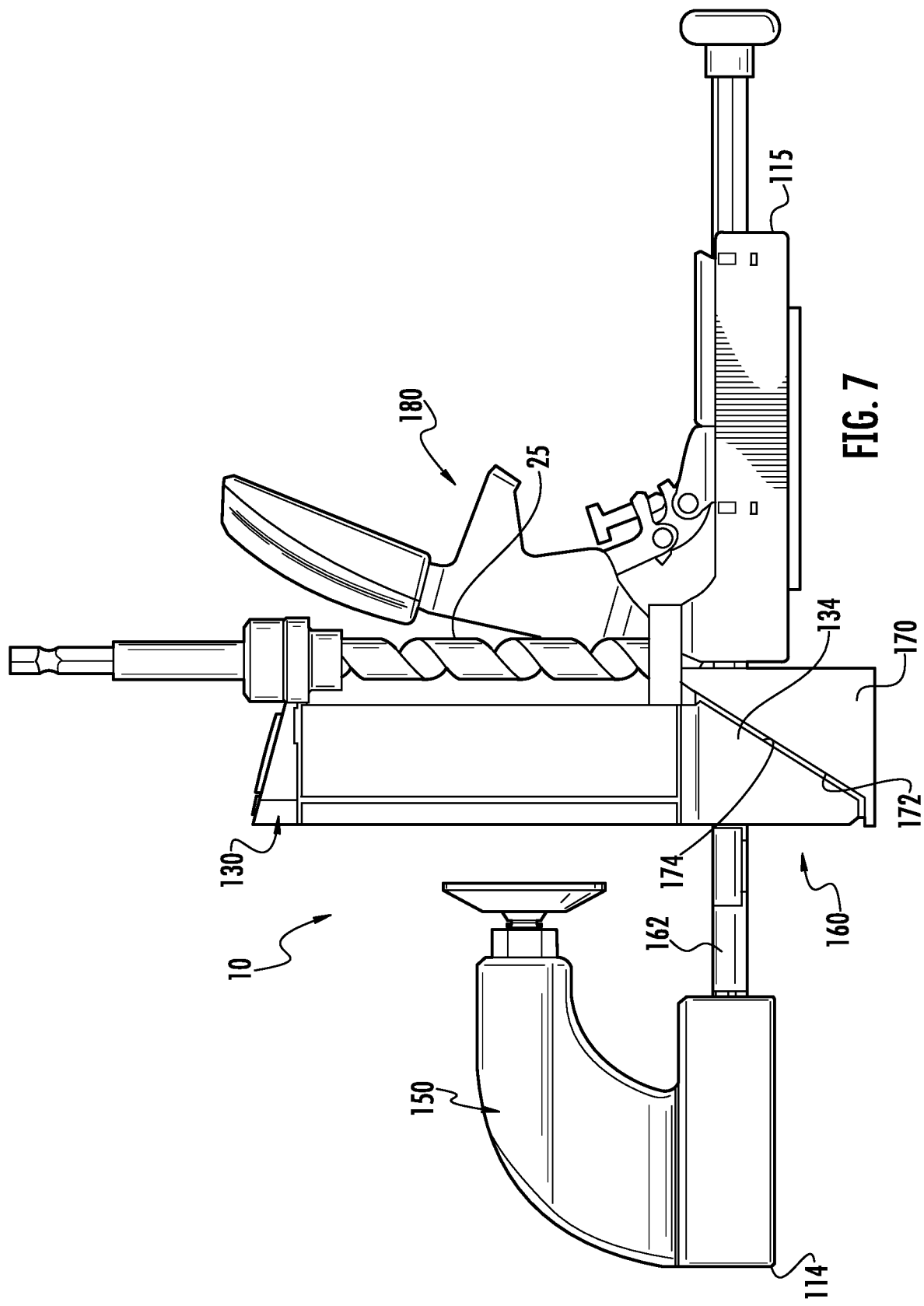
FIG. 7 is a side elevation view of another embodiment of a self-adjusting pocket hole jig in accordance with the present invention, in a lowered position.
Figure 8:
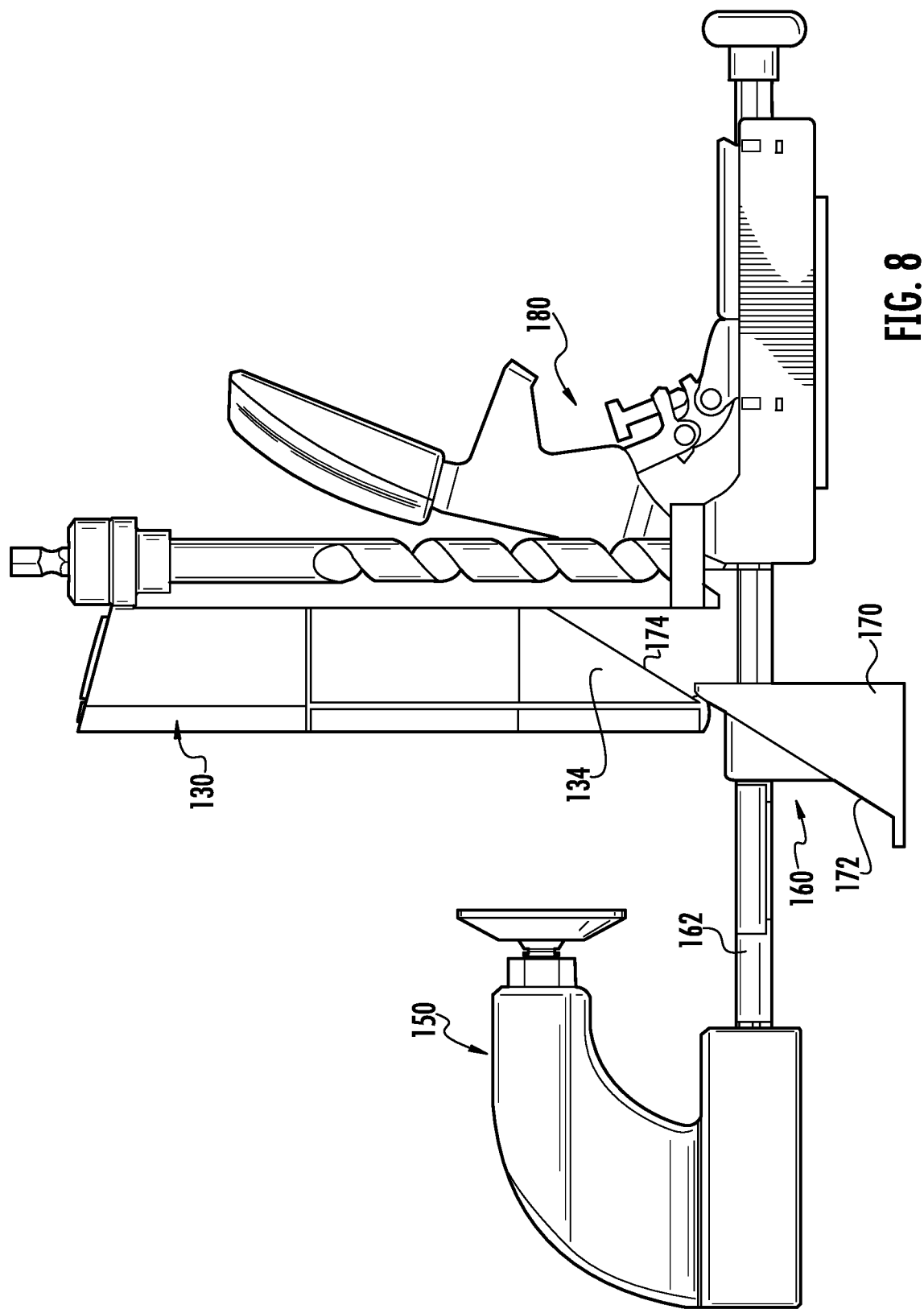
FIG. 8 is a perspective view of the self-adjusting pocket hole jig of FIG. 7, in a raised position.

Turning now to FIGS. 7 and 8, a self-adjusting pocket hole jig generally designated 110 is illustrated. Jig 110 is substantially identical to jig 10, with an adjustment mechanism 160 replacing adjustment mechanism 60. In this embodiment, horizontal linear movement is translated to vertical linear movement by translation mechanism different than that described previously. The translation mechanism, a part of adjustment mechanism 160 includes wedges instead of rack and pinion gears. Jig 110 includes a clamp end 114 and a toggle end 115. A bar 162 passes through a self-adjusting toggle mechanism 180 and is coupled to a clamp assembly 150. A wedge block 170 having a sloped surface 172 facing towards clamp assembly 150 is fixedly carried by bar 162 underlying and engaging a guide 130. A bottom 134 of guide 130 is formed into a wedge shape with a sloped surface 174 facing away from clamp assembly 150. Sloped surface 172 and sloped surface 174 are in a parallel and abutting relationship. As wedge block 170 is moved toward clamp end 114, wedge block 170 slides along sloped surface 174 of guide 130, forcing guide 130 upwardly. As wedge block 170 is moved away from clamp end 114, sloped surface 174 slides down sloped surface 172 of wedge block 170, lowering guide 130. Thus, the movement of guide 130 is contemporaneous with the movement of clamp assembly 150. The relative movements of clamp assembly 150 and guide 130 can be adjusted by altering the angle of sloped surfaces 172 and 174.

Figure 9:
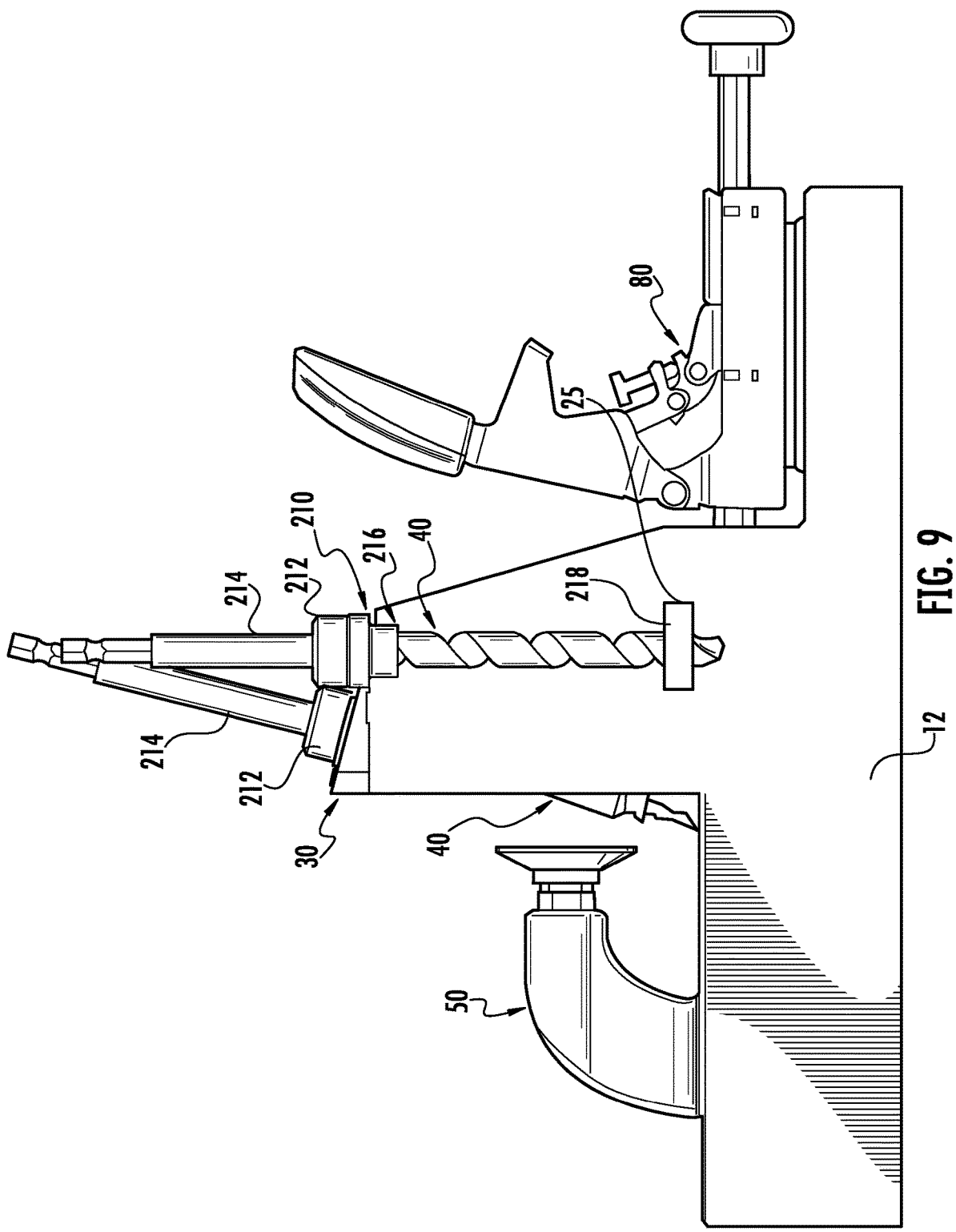
FIG. 9 is a side elevation illustrating the jig with a drill bit length device in a lowered position.
Figure 10:
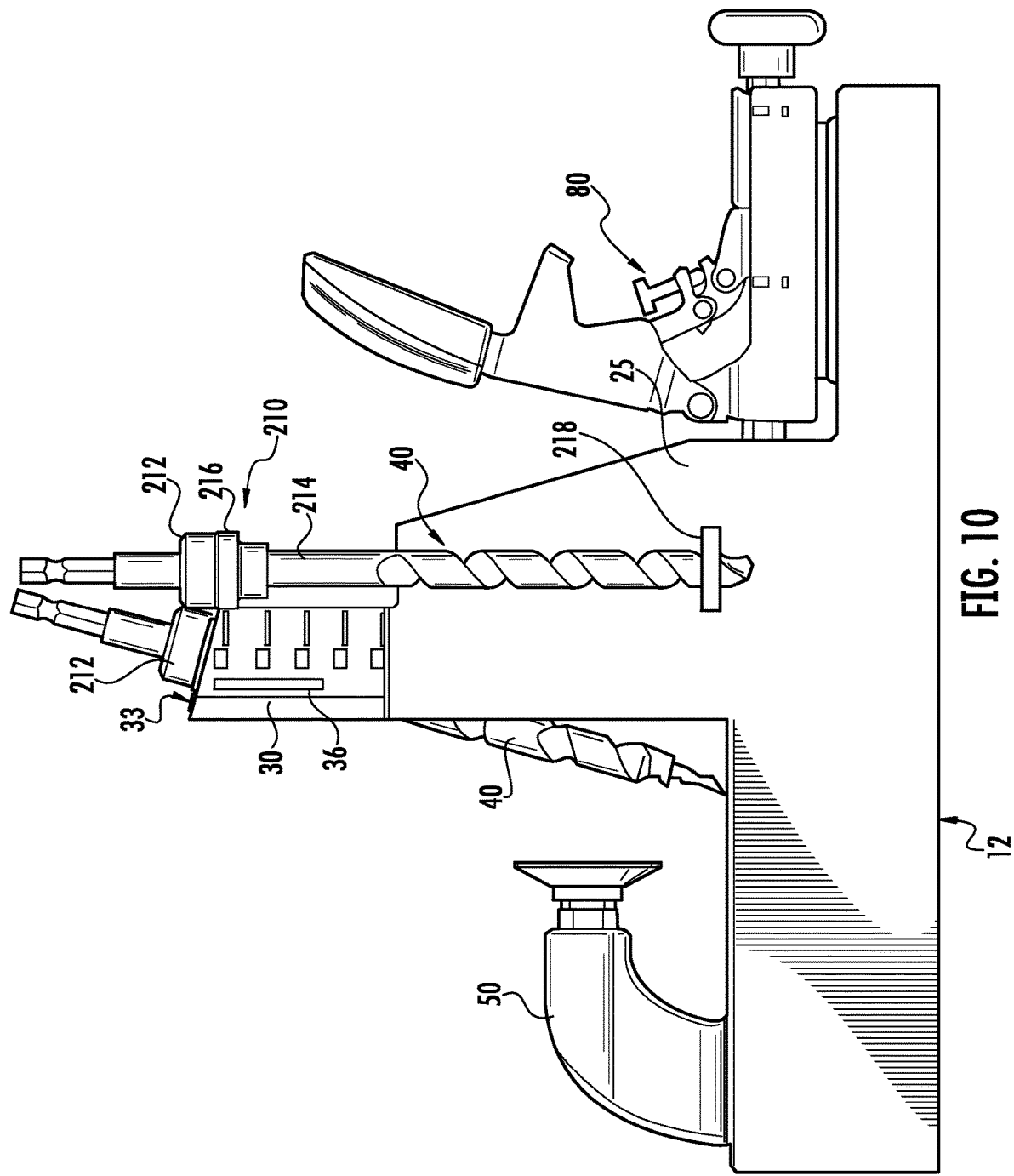
FIG. 10 is a side elevation illustrating the jig with the drill bit length device in a raised position.
Figure 11C:
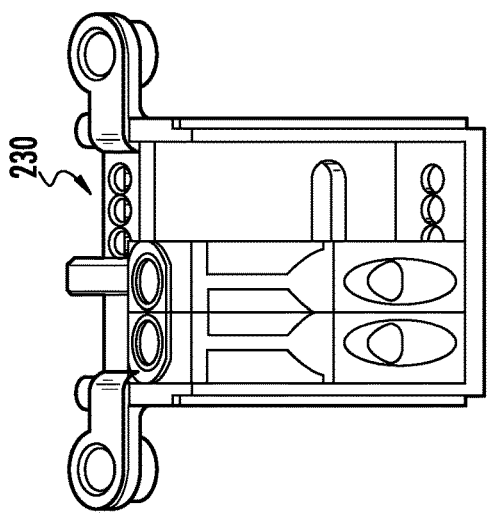
FIGS. 11a-11f illustrate a guide.
Figure 11F:
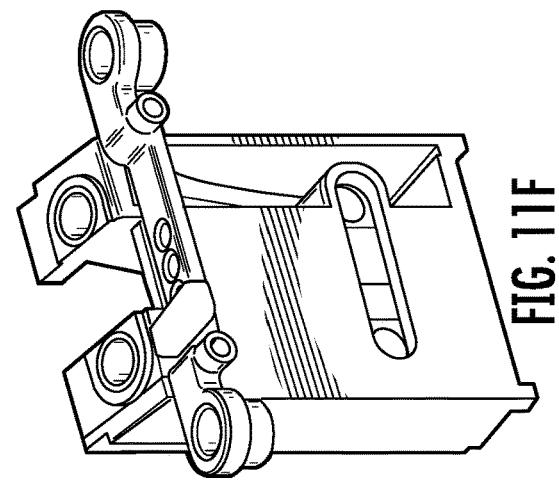
Figure 11B:
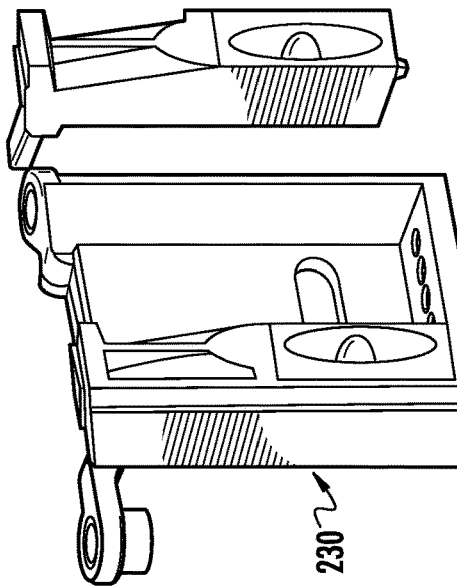
Figure 11E:
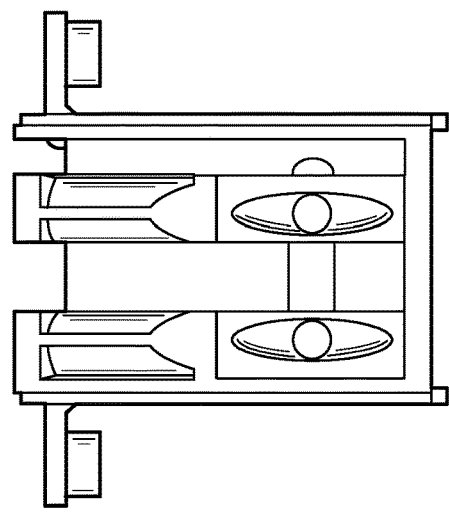
Figure 11A:
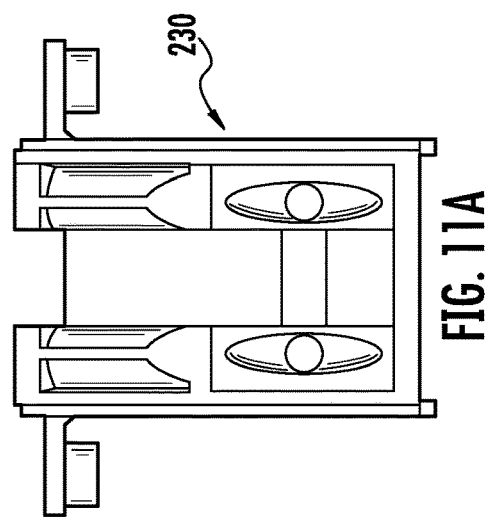
Figure 11D:
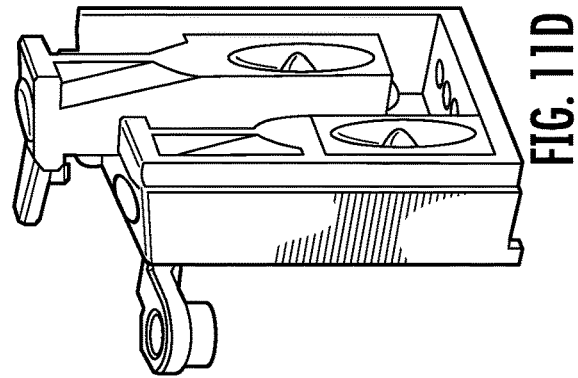

Referring now to FIGS. 9 and 10, jig 10 is illustrated including a drill bit length device 210 for establishing the length of a drill bit 40 for the drilling depth to be used with jig 10 at the setting employed. It will be understood that drill bit length device 210 can be used with jig 110 or jig 10. FIG. 9 illustrates guide 30 in the lowered position. As can be seen, a drill bit 40 extends through guide 30 and out past surface 36 the correct distance for forming a pocket hole in a work piece. Drill bit 40 can only extend a distance limited by a collar 212 fastened to the shank 214 of drill bit 40. To properly position collar 212, drill bit 40 is positioned through adjustment ring 116 extending from top 33 of guide 30 and received by tip receptacle 118 extending from the side of guide holder 25. The distance between adjustment ring 116 and tip receptacle 118 varies with the raised distance of guide 30. For thin work pieces, clamp assembly 50 is close to guide 30, and guide 30 is in a lowered position (FIG. 9). A shallower pocket hole is required, and this distance is provided by the distance between adjustment ring 116 and tip receptacle 118 being shorter to match the required distance. When a thicker work piece is employed, clamp assembly 50 is further away from guide 30, resulting in an increased or raised height of guide 30 (FIG. 10). The raised height increases the distance between adjustment ring 116 and tip receptacle 118, providing the exact length needed for drill bit 40. When drill bit 40 is positioned in drill bit length device 210 with the jig clamping a work piece, the proper drill bit length is at the top of adjustment ring 216. Collar 212 is positioned over shank 214 abutting adjustment ring 216 and tightened into place on shank 214 such as by using a set screw. When the drill bit is removed an inserted through guide channel 35 of guide 30, the drill depth is set appropriate to the work piece being used.

Turning now to FIGS. 11a-11f, a guide 230 is illustrated. Guide 230 includes at least one and preferably two or more guide channel elements 232 selectively positionable within a guide body 233. By positioning guide elements 232 in different locations within guide body 233, the location, number and spacing of pocket holes can be adjusted as desired. Guide 230 is receivable and operable in the same manner as guide 30 described previously. It can also be modified to include a wedge bottom to operate in a manner similar to guide 130.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A pocket hole jig comprising:
   a base having a clamp end and a toggle end;
   a guide carried by the base intermediate the clamp end and the toggle end, and reciprocally movable between a raised position and a lowered position, the guide including at least one guide channels;
   a clamp assembly carried by the base and reciprocally movable between an engaged position when moved toward the guide and a disengaged position when moved away from the guide; and a drill bit length measuring device comprising:
  a tip receptacle carried by the base for receiving a tip of a drill bit; and
  an adjustment ring positioned in line with the tip receptacle for receiving the drill bit therethrough, the adjustment ring reciprocally movable toward the tip receptacle and away from the tip receptacle to indicate a length of the drill to be used.

2. The pocket hole jig as claimed in claim 1 further comprising an adjustment mechanism coupled between the guide and the clamp assembly, the adjustment mechanism arranged to move the clamp assembly in a forward direction to the engaged position and correspondingly move the guide in a downward direction to the lowered position, and arranged to move the clamp assembly in a rearward direction to the disengaged position and correspondingly move the guide in an upward direction to the raised position.

3. The pocket hole jig as claimed in claim 2 wherein the drill bit length measuring device further includes the adjustment ring extending from a top of the guide for receiving a drill bit therethrough, wherein the adjustment ring moves with the movement of the guide, varying the distance from the tip receptacle and determining a length of the drill to be used.

4. A method of measuring a drill bit for use in a pocket hole jig comprising the steps of:
  providing a pocket hole jig comprising:
    a base having a clamp end and a toggle end;
    a guide carried by the base intermediate the clamp end and the toggle end, and reciprocally movable between a raised position and a lowered position, the guide including at least one guide channels;
    a clamp assembly carried by the base and reciprocally movable between an engaged position when moved toward the guide and a disengaged position when moved away from the guide; and
    a drill bit length measuring device comprising:
      a tip receptacle carried by the base for receiving a tip of a drill bit; and
      an adjustment ring positioned in line with the tip receptacle for receiving the drill bit therethrough, the adjustment ring reciprocally movable toward the tip receptacle and away from the tip receptacle to indicate a length of the drill to be used;
  inserting the drill bit through the adjustment ring and seating the tip of the drill bit into the tip receptacle; and
  moving the adjustment ring toward or away from the tip receptacle a distance indicating the length of the drill to be used.

5. A method of measuring a drill bit for use in a pocket hole jig as claimed in claim 4 further comprising the steps of attaching a collar to the drill bit at the length indicated by the adjustment ring.

6. A method of measuring a drill bit for use in a pocket hole jig as claimed in claim 4 wherein the step of providing a pocket hole jig includes providing an adjustment mechanism coupled between the guide and the clamp assembly, the adjustment mechanism arranged to move the clamp assembly in a forward direction to the engaged position and correspondingly move the guide in a downward direction to the lowered position, and arranged to move the clamp assembly in a rearward direction to the disengaged position and correspondingly move the guide in an upward direction to the raised position.

7. A method of measuring a drill bit for use in a pocket hole jig as claimed in claim 6 wherein the step of providing a drill bit length measuring device includes the adjustment ring extending from a top of the guide for receiving the drill bit therethrough, wherein the adjustment ring moves with the movement of the guide, varying the distance from the tip receptacle and determining the length of the drill to be used.

* * * * *